US012786117B2

(12) United States Patent
De Grace et al.

(10) Patent No.: US 12,786,117 B2
(45) Date of Patent: Nov. 3, 2026

(54) NETWORK DEVICE CONFIGURED FOR WORKLOADS IN SOFTWARE DEFINED NETWORKS

(71) Applicant: MICROSOFT TECHNOLOGY LICENSING, LLC, Redmond, WA (US)

(72) Inventors: Gerald Roy De Grace, Atlanta, GA (US); Deepak Bansal, Bellevue, WA (US); Rishabh Tewari, Sammamish, WA (US); Srikanth Kandula, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 18/401,309

(22) Filed: Dec. 29, 2023

(65) Prior Publication Data

US 2025/0219942 A1 Jul. 3, 2025

(51) Int. Cl.
*H04L 12/66* (2006.01)
*H04L 45/74* (2022.01)

(52) U.S. Cl.
CPC .................................... *H04L 45/74* (2013.01)

(58) Field of Classification Search
CPC ............. H04L 12/4633; H04L 12/4641; H04L 63/0272; H04L 45/745; H04L 45/74; H04L 69/22; H04L 49/70; H04L 2101/622; H04L 61/103; G06F 2009/45595; G06F 2009/4557; G06F 2009/45587; G06F 13/102; G06F 9/45558
See application file for complete search history.

(56) References Cited

U.S. PATENT DOCUMENTS 11,328,222 B1 * 5/2022 Matthews ............... H04L 47/32
2015/0229724 A1 * 8/2015 Ray ..................... H04L 12/4633 370/352
2021/0194831 A1 * 6/2021 Huang ..................... G06N 3/08
2021/0226892 A1 * 7/2021 Fu ........................... H04L 45/66
2022/0060418 A1 * 2/2022 Le ........................... H04L 45/38
2022/0231941 A1 * 7/2022 Kaliyamoorthy ..... H04L 45/586
2022/0311832 A1 * 9/2022 Shukla ...................... G06T 1/20
2022/0318052 A1 * 10/2022 Sivathanu ............. G06F 9/5088
(Continued)

OTHER PUBLICATIONS

Chu, et al., "Exploiting Hardware Multicast and GPUDirect RDMA for Efficient Broadcast", IEEE Transactions on Parallel and Distributed Systems, vol. 30, Issue 3, Aug. 26, 2018, 14 pages.
(Continued)

*Primary Examiner* — Kharye Pope
(74) *Attorney, Agent, or Firm* — Han Gim; Newport IP, LLC

(57) ABSTRACT

An enhanced router is described that improves network performance for AI workloads by providing in-network primitives that improve the performance of operations such as Broadcast and Reduce operations. The enhanced router leverages the observation that operations such as the Broadcast and Reduce primitives are more performant (e.g., reduced latency and bandwidth) when performed in the network rather than in graphics processing unites (GPUs) or central processing units (CPUs) which are often deployed as leaf nodes in a typical network topology in a datacenter.

20 Claims, 12 Drawing Sheets

(56) References Cited

U.S. PATENT DOCUMENTS

| | | | | |
|---|---|---|---|---|
| 2023/0035657 A1* | 2/2023 | Underwood | G06F 9/522 | |
| 2023/0300002 A1* | 9/2023 | Shen | H04L 47/803 | 709/220 |

OTHER PUBLICATIONS

Liu, Xin, "SONiC opens more opportunities for network innovation", Retrieved from: https://azure.microsoft.com/en-us/blog/sonic-opens-more-opportunities-for-network-innovation/, Nov. 29, 2021, 3 pages.

Ma, et al., "FPGA-based AI smart NICs for scalable distributed AI training systems", Retrieved From: https://arxiv.org/pdf/2204.10943, Apr. 22, 2022, 5 pages.

International Search Report and Written Opinion received for PCT Application No. PCT/US2024/055590, Feb. 11, 2025, 15 pages.

Sapio, et al., "Scaling Distributed Machine Learning with In-Network Aggregation", arxiv.org, Cornell University Library, Sep. 30, 2020, 25 pages.

International Preliminary Report on Patentability (Chapter I) Received for PCT Application No. PCT/US2024/055590, Jul. 9, 2026, 09 pages.

* cited by examiner

NETWORK DEVICE CONFIGURED FOR WORKLOADS IN SOFTWARE DEFINED NETWORKS

BACKGROUND

A data center houses computer systems and various networking, storage, and other related components. Data centers, for example, are used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. Network bandwidth and latency are critical constraints for some workloads. For example, for artificial intelligence (AI) workloads, large amounts of data (e.g., weights) need to be moved between successive AI training/inferencing phases. The efficient processing of workloads and efficiently utilizing the physical and virtual network devices are important for maintaining scalability and efficient operation in such networks.

It is with respect to these considerations and others that the disclosure made herein is presented.

SUMMARY

The present disclosure describes an enhanced router/smart switch that improves network performance (latency and bandwidth) for workloads by providing in-network primitives that improve the performance of operations such as Broadcast and Gather and Reduce that are used, for example, in AI workloads. The enhanced router/smart switch leverages the observation that the Broadcast and Reduce primitives are more performant (e.g., reduced latency and bandwidth) when performed in the network rather than in graphics processing unites (GPUs) or central processing units (CPUs) which are often deployed as leaf nodes in a typical network topology in a datacenter. Broadcast and Reduce primitives are more performant when performed in the network because in-network processing avoids duplicate transmission of identical data and reduces latency by utilizing the inherent tree topology in the network rather than building a tree topology among the GPUs or CPUs.

In an SDN that implements an enhanced router/smart switch for processing specified workloads, primitives are implemented in the network processors in the enhanced router. The primitives operate on communication traffic that is specified in collectives: all-gather, all-reduce, reduce-scatter, etc. These primitives reduce the time to finish collectives (e.g., lower latency) or reduce the amount of network traffic from collectives (e.g., lower total bandwidth usage), allowing for faster training, inference, and more efficient servicing of workloads. Examples included in this disclosure include multicast, in-network aggregation, and gradient compression.

The described techniques can allow for virtual computing environments to support a variety of workload configurations while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
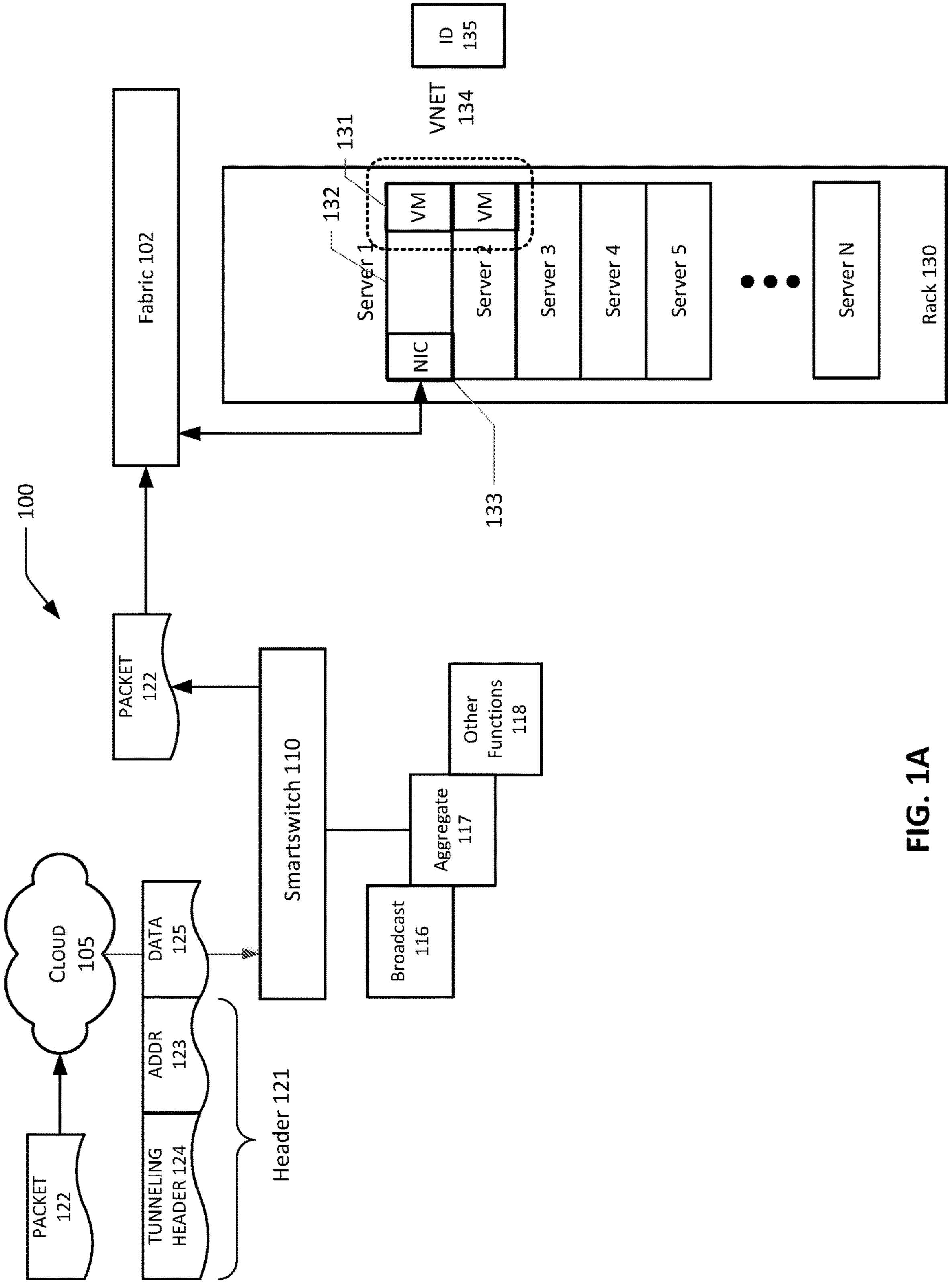
FIG. 1A through 1H are diagrams illustrating an example architecture in accordance with the present disclosure.

Network bandwidth and latency are critical constraints for certain workloads. For example, in AI workloads, large amounts of data (e.g., weights) need to be moved between successive AI training/inferencing phases. Network performance is thus a key determinant for the completion time of a workload. Additionally, by enabling fast movement of data, the capabilities of the network can reduce the time to completion and improve GPU efficiency by driving up network utilization. While the following description describes embodiments in the AI workload context, it should be understood that the disclosed principles are applicable to other types of workloads.

The disclosed embodiments enable datacenters to provide services in a manner that can enhance system flexibility and efficiency while reducing cost and complexity, allowing for more efficient use of computing, storage, and network resources. Efficient implementation of the end-to-end services by a cloud service provider can enable an experience that is seamless and more consistent across various footprints. The effective distribution of the described disaggregation and pooling techniques can also be determined based on the implications for various performance and security implications such as latency and data security.

The various embodiments disclosed herein provide an enhanced router/smart switch that improves network performance, for example, for AI workloads by providing in-network primitives that improve the performance of Broadcast and Gather and Reduce operations used in AI workloads. As used herein, the enhanced router may also be referred to as a smart switch or Smartswitch and can be referred to as an AI router when used in the context of AI workloads.

In the example of AI workloads, there are several primitive AI workload operations that drive network traffic, such as:

- AllGather/Broadcast: Once the weights have been computed at each of the GPUs, the weights need to be distributed to every GPU serving that workload.
- AllReduce/Reduce: This operation involves summation of the weights gathered from each GPU.
- ReduceScatter: This operation involves AllReduce and Broadcast.

The disclosed embodiments leverage the observation that primitives such as the Broadcast and Reduce primitives are more performant (e.g., reduced latency and bandwidth) when performed in the network rather than in GPUs/CPUs which are deployed as leaf nodes in a typical network topology in a datacenter. Broadcast and Reduce primitives are more performant when performed in the network because in-network processing avoids duplicate transmission of identical data and reduces latency by utilizing the inherent topology of the network rather than building a tree topology among the GPUs/CPUs.

In an SDN that implements an enhanced router for processing workloads such as AI workloads, primitives are implemented in the network processors in the enhanced router. The primitives operate on communication traffic that is specified in collectives: all-gather, all-reduce, reduce-scatter, etc. These primitives reduce the time to finish collectives (e.g., lower latency) or reduce the amount of network traffic from collectives (e.g., lower total bandwidth usage), allowing for faster training, inference, and more efficient servicing of ML workloads. Examples included in this disclosure include multicast, in-network aggregation, and gradient compression.

In an embodiment, an application programming interface (API) is implemented to provide a standard interface to abstract underlying hardware differences and allow interoperability between enhanced router devices. The API allows for one-to-one transformations, one-to-many transformations, and many-to-one transformations when implementing the primitives.

The enhanced router can be an Ethernet switch enhanced with data processing units (DPUs) and configured to provide:

- Support for Broadcast and Summation/Reduce operations on a per workload basis. Since a switch serves multiple servers which have their own GPUs which can be allocated to different workloads, the enhanced router provides a per workload broadcast. To support this feature, the enhanced router incorporates specific enhancements for packet encapsulation that identifies which primitive is invoked by the applications.
- Incorporation of extensions to the network operating system of the enhanced router which provides APIs to program in-network processing operations.

Additionally, the enhanced router can be deployed as a Tier 0 or a T1 switch or multiple devices can be deployed at various places in the network, allowing for the enhanced routers to be incrementally used to enhance network performance by offloading work from CPUs/GPUs.

To enable broadcast or multicast support, each workload may be identified using a unique ID such as a VXLAN ID. The described examples are illustrated using VXLAN, but it should be understood that the disclosed principles can be implemented using other tunneling technologies. If the destination address of a packet in the VXLAN header indicates a broadcast IP address or the address of the multicast group, the enhanced router forwards that packet to all nodes in the associated group based on the VNET ID or multicast group address. The enhanced router is programmed with group membership information by a network controller using the extension APIs.

To enable Reduce (Summation) support, the enhanced router provides Summation support for multiple summation operations that are in progress and support for retransmission of same data. The enhanced router implements a mechanism for eliminating duplicate data. The enhanced router further implements a partial computation where a portion of the computation can be completed at the GPU/CPU, thereby enabling coexistence with legacy mechanisms to compute at the GPU/CPU. Each packet with data that needs to be aggregated identifies the aggregation operation by indicating the operation ID and operation type as well as the data size and location within the packet. This information can be included in VXLAN extension headers, or other types of headers in various tunneling protocols. The packets also specify other salient information regarding the aggregation such as the output format and the aggregation delay period. The results of the aggregation operation can be sent to one or all members of a specified workload group.

Referring to the appended drawings, in which like numerals represent like elements throughout the several FIGURES, aspects of various technologies for AI support will be described. In the following detailed description, references are made to the accompanying drawings that form a part hereof, and which are shown by way of illustration specific configurations or examples.

Referring to FIG. 1A, illustrated is an example of utilizing an enhanced router according to an embodiment. A virtualized computing network 100 includes a plurality of computing nodes such as servers 132 that are typically housed in a rack 130. The servers 132 host a plurality of virtual machines 131 and network interface cards (NICs) 133. In one embodiment, virtualized computing network 100 includes a Smartswitch 110. The various illustrated components such as servers 132 are configured to implement a software defined network (SDN). At least some of the hardware-based network interface devices are configured to enable communications between the virtual machines 131 within a user network 134 of the virtualized computing network 100 in accordance with associated policies.

The Smartswitch 110 receives an input data packet 122, for example via cloud 105. The input data packet 122 can be addressed to an endpoint hosted by a VM 131 of the user network 134. The Smartswitch 110 can facilitate operations such as Broadcast 116, Aggregate 117, as well as other functions 118. The Smartswitch 110 forwards the input data packet 122 to a hardware-based network interface device such as NIC 133. In some embodiments, the forwarding of the input data packet 122 can be facilitated by fabric 102 that can include various networking devices such as switches.

In an example, an AI workload is identified as being processed in the computing network 100. A destination address 123 of a header 121 of the data packet 122 is determined. In response to determining that the destination address 123 indicates a broadcast IP address, the data packet 122 broadcast to all nodes associated with an ID such as a VNET ID 135 of the AI workload. An aggregation operation of the data packet 122 is identified based on an operation ID, operation type, and data ID in an extension header (such as a tunneling header) 124 of the data packet 122. In response to determining that the data packet 122 needs to be aggregated, results of the aggregation operation are broadcast to all nodes associated with the VNET ID 135 of the AI workload. Operations can be performed on data 125 of the packet 122.

The present disclosure includes network processor primitives to assist machine learning workloads. In an embodiment, the primitives can be implemented in network interface cards (NICs) that are directly attached to servers, in switches and routers in the network infrastructure, disaggregated pools of NICs, and the like.

At least some of the network processor primitives include those related to communication traffic that is specified in collectives, for example all-gather, all-reduce, reduce-scatter, and the like. Reducing the time to finish collectives (e.g., lower latency) or reducing the amount of network traffic from collectives (e.g., lower total bandwidth usage) enables faster training, inference, and lower implementation costs to service ML workloads.

One example of a primitive that the described API enables offloading to network processors includes multicast. Many collectives, including all-gather and reduce-scatter, send the same data to multiple recipients. Using multicast to carry such data reduces the number of copies that are carried on the network.

One example of a primitive that the described API enables for offloading to network processors includes in-network aggregation. Some collectives such as all-reduce perform associative and commutative operations on groups of data items. For example, all-reduce is commonly used to compute gradients, where each participating GPU sends its partial gradient to a recipient which computes a sum of the gradients. The sum must be broadcast to all participating GPUs which would benefit from the above multicast primitive.

With in-network aggregation, the aggregation operation is performed in the network processors. That is, a switch which receives a few of the partial gradients can emit the sum of these gradients. In-network aggregation reduces the amount of data carried on the network as well as amount of the computation at the host GPUS (to aggregate) and speeds up the computation by reducing communication time for data.

One example of a primitive that the described API enables offloading to network processors includes gradient compression. Gradients can be compressed to trade-off reduction in network communication costs (latency and bandwidth) for answer quality (e.g., approximate convergence of training models). Examples include reducing the size of floating points, applying learned (e.g., deep neural network) transformations on the gradients, and the like.

In an embodiment, an application programming interface (API) is provided to allow multiple entities to provide implementations of the primitives while allowing for interoperability. Additionally, the on-processor implementations can be decoupled from the control plane that will use these implementations. Thus, the primitives are only specified at the granularity of what each processor performs. The control path specifies the operations at each processor (e.g., which packet fields to read or write into) so that interoperability is enabled. Additionally, the API abstracts the network technology (e.g., Infiniband). The API is operable to support a wide range of primitives including but not limited to those described herein. In various embodiments, the API is implemented in network processors.

In an embodiment, the API supports transformations for at least three classes:

One-to-one transformations: These transformations take as input a single packet and emit a packet. The API allows for a broad class of per-packet transformations if the transformations are effectively stateless, so that they can also be implemented in parallel without requesting support for coherence or memory. Examples of such transformations include degrading floating point resolution and gradient compression.

One-to-many transformations: These transformations can emit multiple packets for one packet. Multicast is an example of this transformation. The API allows for a broad class of one-to-many transformations ranging from flexibility in (a) which packets to transform and (b) the kinds of changes to make in the packets that will be output. In an embodiment, the transformations are effectively stateless.

Many-to-one transformations: These transformations specify grouping criteria on input packets and emit one output packet per group. For example, in the case of in-network aggregation, the grouping criteria may be the epoch identifier and the output can be a sum of the gradients received that have the same epoch identifier. In an embodiment, the API specifies (a) a matching clause to identify a group, (b) the time-duration for how long to wait before emitting, and (c) the transformation on the packet which includes the commutative and associative operation to perform on packet contents (e.g., sum).

These transformations are stateful. To assess the amount of state per currently active group, the memory footprint may be as small as one packet. That is, it may not be necessary to store all packets that match in the group. For example, when computing gradient sum, the memory footprint is one packet—the sum (or average) of all the gradients received thus far.

Some classes of transformations can overlap with or be used in conjunction with transformations from other classes. For example, a one-to-many transformation such as multicast may also send compressed gradients. Furthermore, the classes can be combined to obtain new net transformations such as many-to-many transformations where the output of a group's sum is sent to multiple recipients.

The primitives supported by the API are applicable to applications beyond machine learning (ML) workloads. For example, virtual-taps, wherein packets matching a condition (or all packets) are forwarded to a separate diagnostic service point can be supported in this API as a one-to-many transformation. That is, packets matching the tapping criteria will be forwarded not only to their original destination but also to the diagnostic service point. As another example, aspects of INT telemetry such as counting different aspects (numbers of bytes, packets that match a criteria) can be implemented using many-to-one transformations in this API. NDP, which removes the data body of a packet and forwards just the packet headers onwards instead of dropping packets when queues start building up, can also be implemented as a one-to-one transformation. The ability to change parts of a packet header based on a match condition can also be used to enable many different routing and load balancing schemes.

For the control path, embodiments may include simple common constructs such as:

- transformation IDs (to identify individual transformations),
- match clauses (to identify the packets or groups that will receive a transformation),
- transformation details such as which offsets to read, edit etc. and the actual operation to perform.

For the data path, matching functions will identify which packets to apply a transform upon. The matching functions may be supported across all transformations and comprise the offset from which to pick up the values of the identifier and the Boolean valued filter expressions.

Boolean operations can be equality, less than, greater than, and the like. An example matching function is 'destination IP address matches a multicast group value.'

For transformation specifiers:

For many-to-* transformations:

- the offset(s) to find the group identifier (e.g., the epoch ID; note: this value may be inside the TCP payload)
- the offset(s) to find the aggregation value (this can be a variable length array in the case of in-network aggregation)

the amount of delay to wait between when the first packet in a group is received and until emitting an output packet and flushing the state.

the (associative and commutative) operation to apply over the aggregation value.

Example operations are sum, average, variance, sample the temporary object store to keep partial results of aggregation operations.

the offset in the output packet where the aggregated value is to be written.

the offset in the output packet where the group IDs whose value is reflected in the aggregation will be written.

Example: list of source IP addresses whose gradients have been added

For *-to-many transformations:

the number of copies to make.

the offset to change in the output packet and a vector of values that specifies the value to write into each output packet.

Example: a list of (destination) IP addresses per multicast group; one output packet will be generated to each unique IP address in the list The transformations to apply on the packet may be specified in code written in similar contexts such as an eBPF program or a P4 program.

Common transformations may be pre-implemented in the processor and specified end-to-end such as Remove packet body (e.g., all content after an offset) for NDP.

Convert 32 bit integers to 8 bits.

Dictionary replacement (using a fixed size dictionary) as used in one-hot encoding and word2vec.

The disclosure provides a protocol that declares transformations that can be executed by NICs, switches, or appliances within the network. In an embodiment, the protocol may be referred to as In-network Transformation Protocol (INTP). The protocol enables interoperability across multiple implementors and decouples changes that must be made to the host driver from changes in the network elements. In an embodiment, the header can be included in RDMA over Converged Ethernet or Infiniband or other transport mechanism.

Figure 1B:
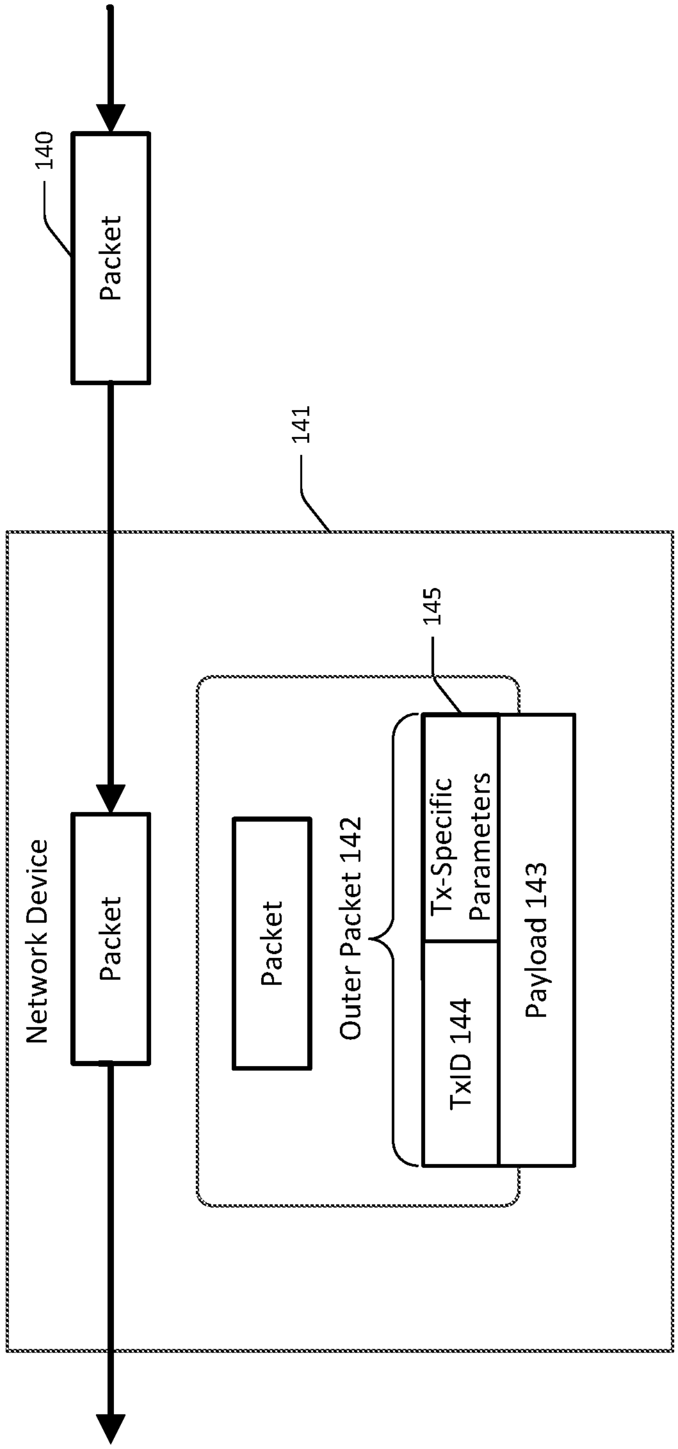

In an embodiment, message-sized headers (e.g., using jumbo frames) can be implemented. FIG. 1B illustrates an example high-level protocol format according to the disclosed embodiments. The high-level format can be implemented by network device 141. The high-level protocol format for a packet 140 with outer packet 142 includes a Tx ID 144 or Transformation ID 144. These identifiers are a contract between the end-hosts (e.g., NCCL drivers) and the network elements that implement the transformations. The contract is initiated via the control-plane protocol as shown herein. Tx-Specific Parameters 145 are parameters that are specific to the transformation ID, examples of which are provided herein. Payload 143 is similar to payloads generally for data packets.

In the example of multicast, the source requests multicast transformations and specifies the corresponding group-address. The group address may be the list of GPUs participating in an all-gather collective.

The control plane protocol is responsible for communicating with appropriate network elements on the path that they must honor this transformation. The mapping between group addresses to the list of individual addresses that belong to the group can be performed using a standard protocol such as IGMP or have this mapping specified by the control plane.

Figure 1C:
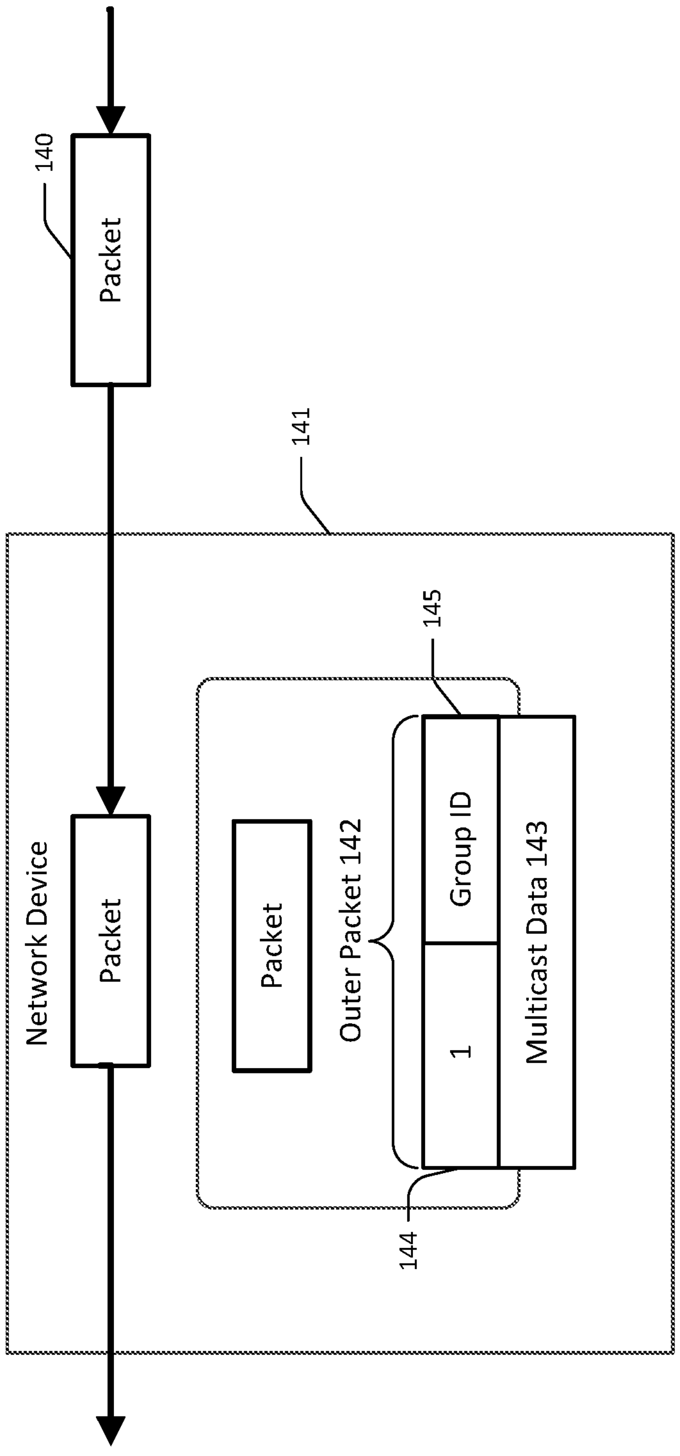

FIG. 1C illustrates an example multicast protocol format according to the disclosed embodiments. The format can be implemented by network device 141. The multicast protocol format for the packet 140 with outer packet 142 includes a Tx ID 144 set to "1" and Tx-Specific Parameters 145 set to the Group ID. Payload 143 contains the multicast data.

The source may send such packets towards a network element that honors the transformation. More implicitly, a ToR switch on the path may implement the transformation. A network element that processes this packet edits the outer packet header with the IP addresses of the individual constituents of the group.

Figure 1D:
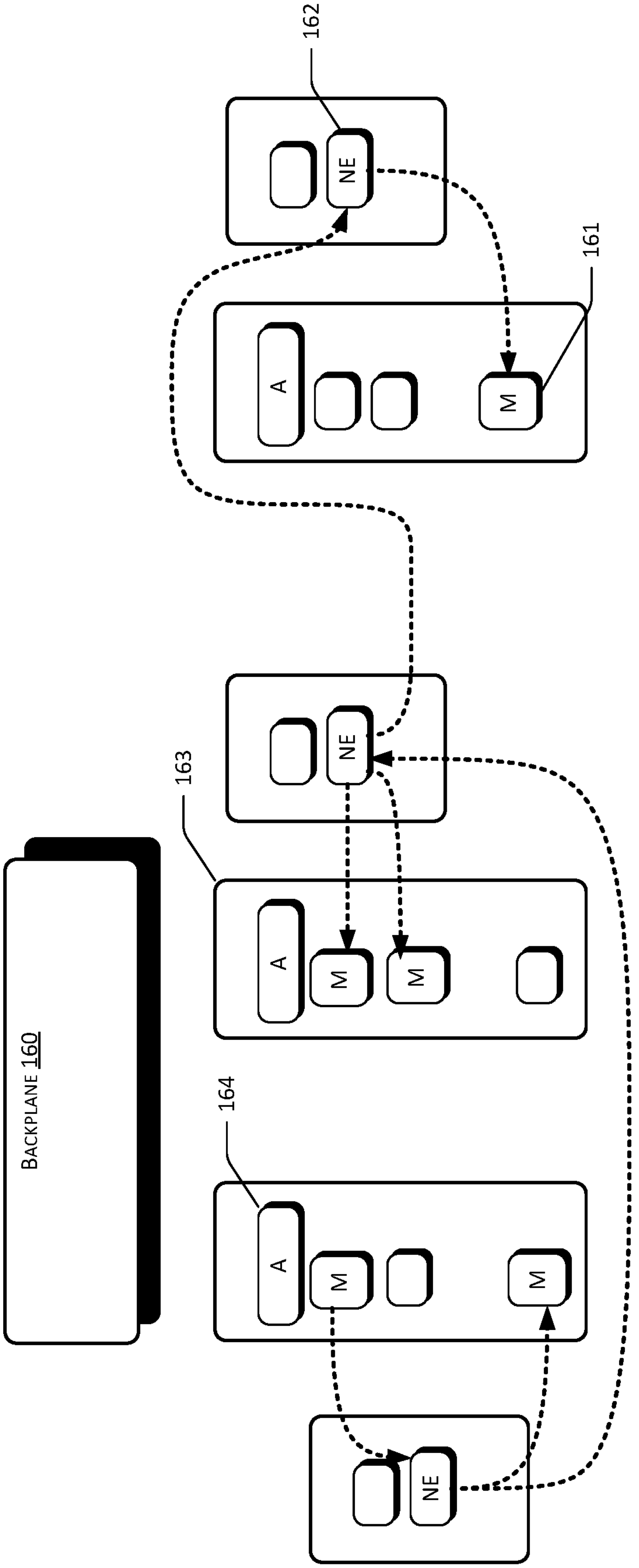

As shown in FIG. 1D, in some embodiments, chains of network elements can be configured to coordinate. FIG. 1D illustrates a backplane 160 and racks of devices 163. The racks 163 can include Top-of-Rach (ToR) switches 164. The nodes 161 are the multicast recipients and network elements 162 are assisting with the transformation.

Figure 1E:
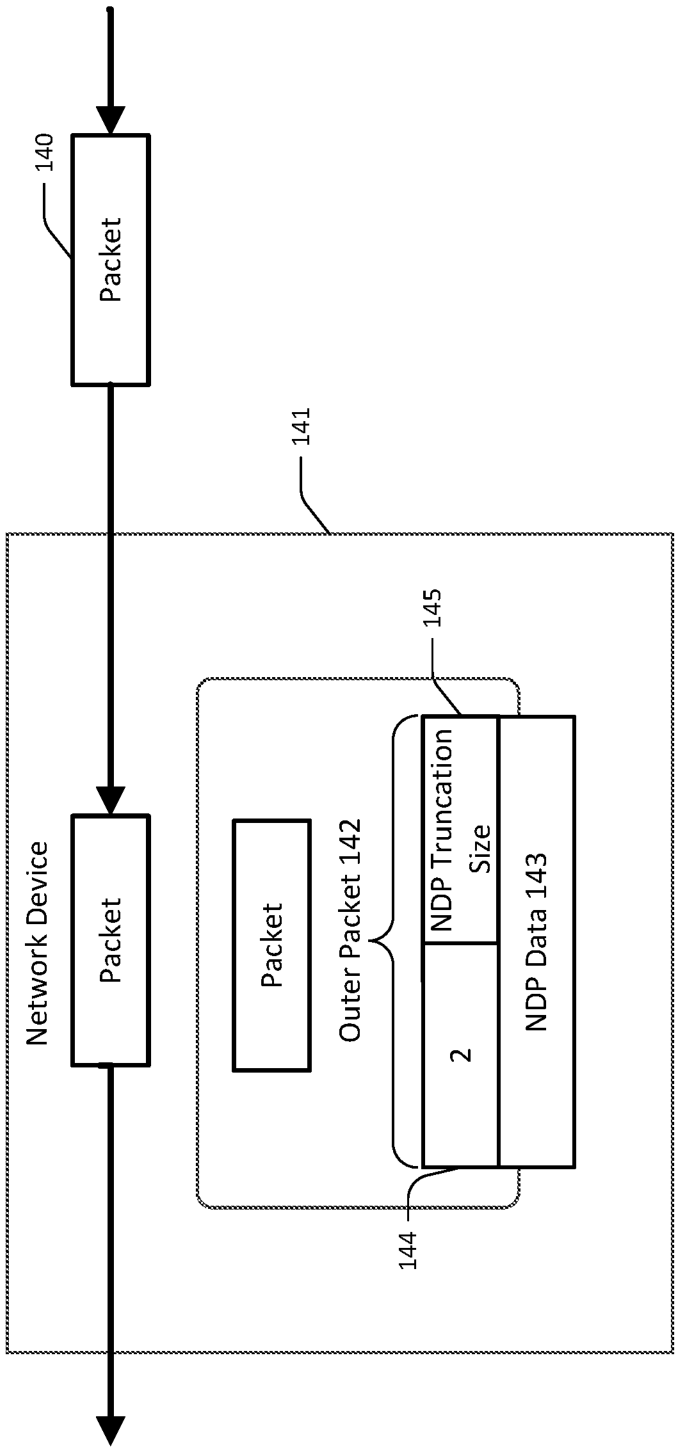

FIG. 1E illustrates an example with Network Datagram Protocol (NDP). The format can be implemented by network device 141. The NDP protocol format for the packet 140 with outer packet 142 includes a Tx ID 144 set to "2" and Tx-Specific Parameters 145 set to the NDP truncation size. Payload 143 contains the NDP data. In an embodiment, the end-host may determine the truncation size. When dropping a packet, network elements that honor this transformation may instead truncate the packet and send it forward.

In the example of gradient compression, floating point, and the like, techniques can be implemented that reduce message sizes and floating-point representations to reduce the amount of computation involved. Some examples include MSFP, TensorRT, and FlexPoint.

Figure 1F:
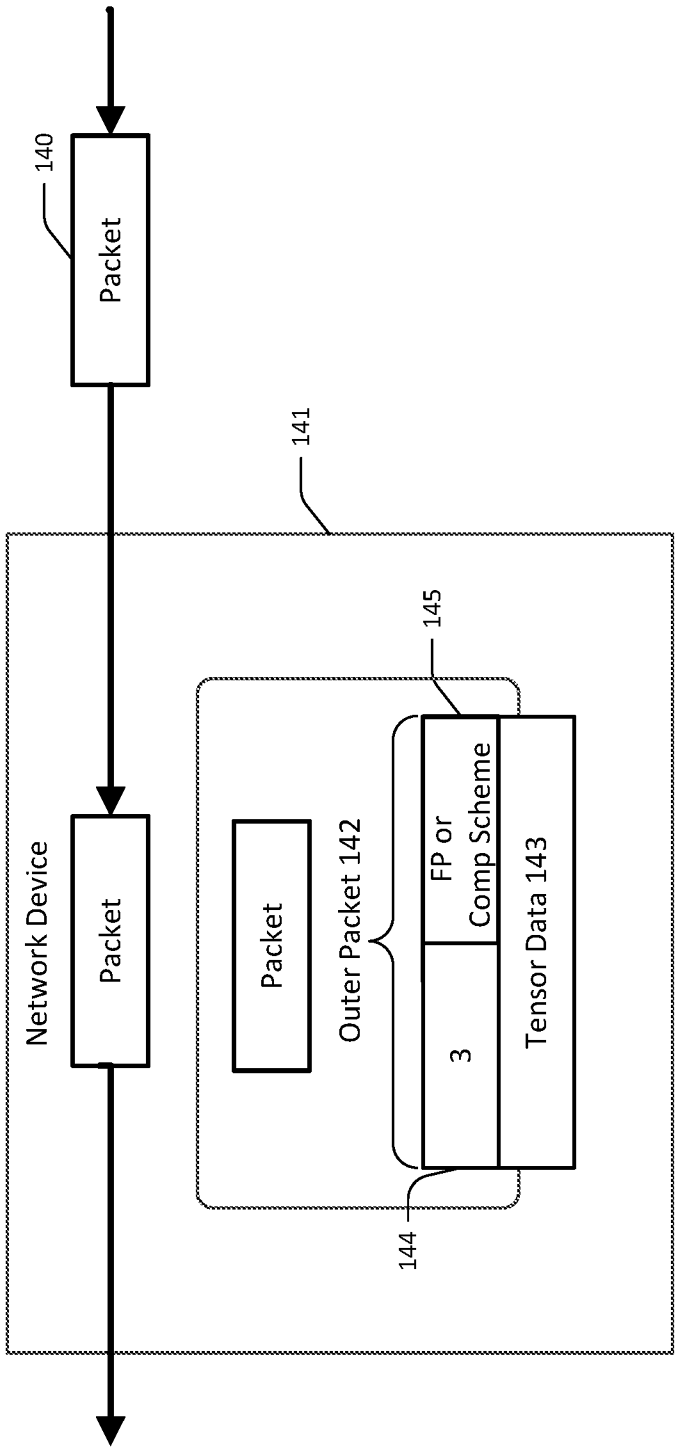

FIG. 1F illustrates an example with a floating point or compression scheme. The scheme can be implemented by network device 141. The floating point or compression scheme protocol format for the packet 140 with outer packet 142 includes a Tx ID 144 set to "3" and Tx-Specific Parameters 145 set to the floating point or compression scheme. Payload 143 contains the tensor data.

Figure 1G:
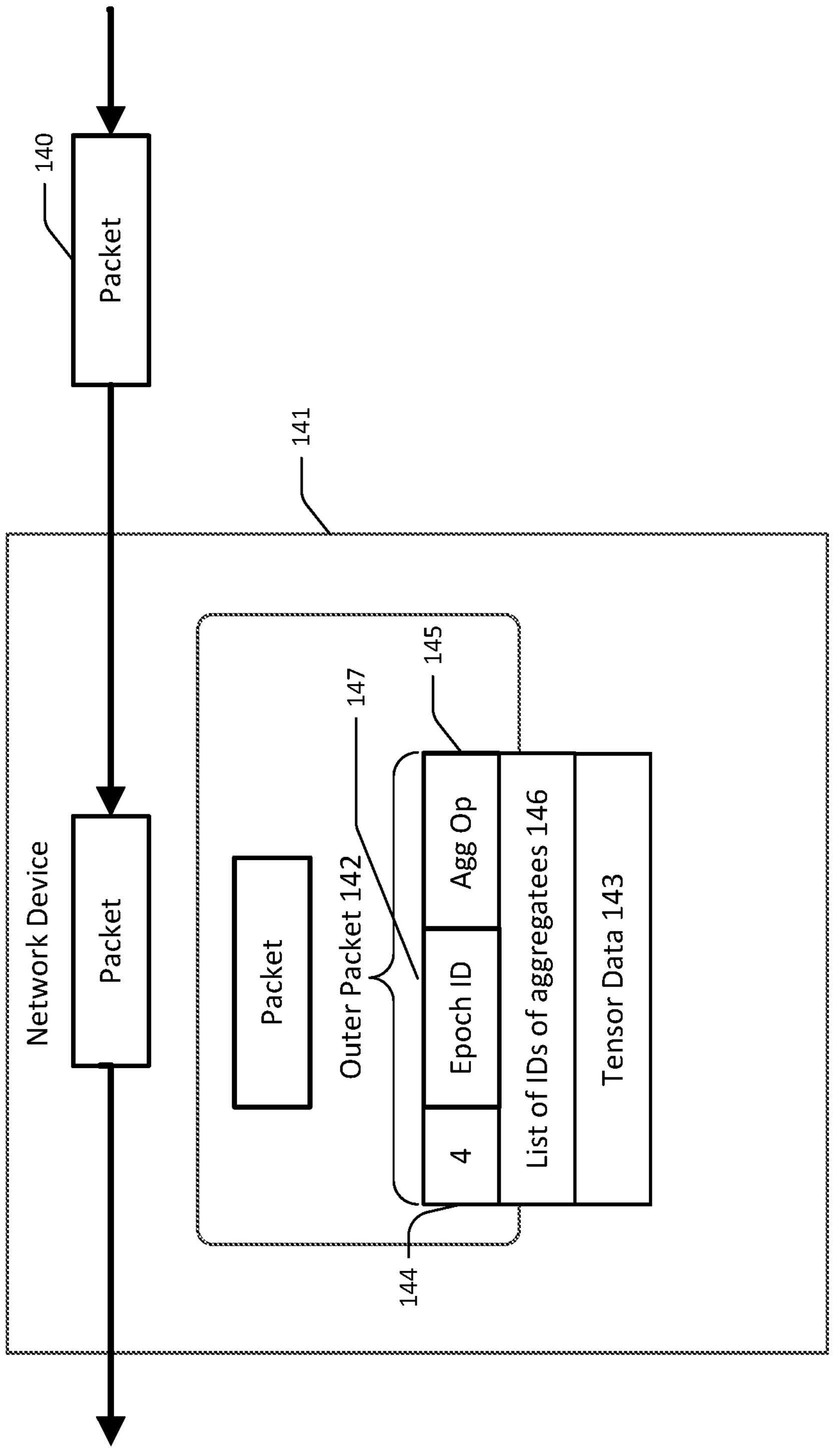

FIG. 1G illustrates an example with in-network aggregation. The format can be implemented by network device 141. The in-network aggregation protocol format for the packet 140 with outer packet 142 includes a Tx ID 144 set to "3" and Tx-Specific Parameters 147, 145 set to the epoch ID and aggregation operation and list of aggregates 146. Payload 143 contains the tensor data. In an embodiment, the source(s) specify an epoch identifier, the aggregation operation (e.g., XOR, average etc.), and identify themselves as the aggregatee.

Figure 1H:
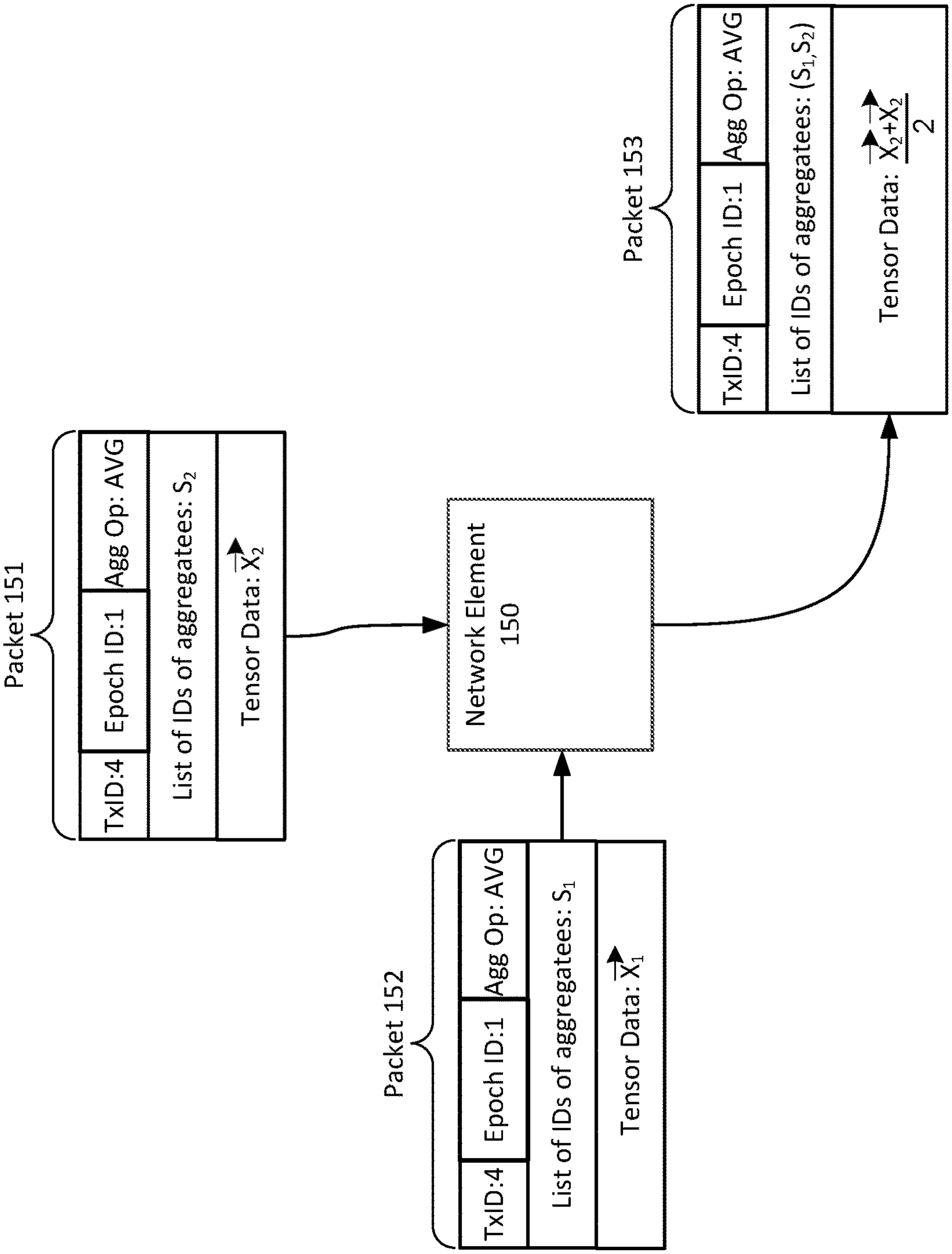

A network element that honors this transformation will store the tensor for some amount of time (either implicitly determined or specified by the control plane protocol). All tensors obtained that have the same epoch ID will be coalesced into a single packet using the aggregation operation and the list of aggregatees will be expanded. FIG. 1H illustrates one example where network element 150 stores the tensor data received in packet 151 and 152 with epoch ID "1" for some amount of time. All tensors obtained that have the same epoch ID "2" are coalesced into a single packet 153 using the aggregation operation and the list of aggregatees expanded to $S_1$ and $S_2$.

As with the case of multicast above, in-network aggregation can be applied recursively by more than one network element on a given network path. Additionally, there may not be any network elements on a network path that implement network aggregation. In such cases, the receiver will obtain the tensor data from individual sources.

At the source, a driver is configured to add the appropriate transformation header. Sources may also change what they emit. For example, with multicast, the sources emit one packet to the group address and not one packet per group constituent.

At the receiver, the driver is configured to be aware of and consume the transformation header. Receivers may also change how they handle, for example, in-network aggregation. Receivers should expect to receive fewer packets than one packet per group constituent.

Determining which network element(s) honor which transformation is the responsibility of the control protocol. The transformations are singletons, i.e., specific to individual network elements.

Similar to SDN goal-state dissemination: each network element that participates in the transformation may subscribe to an item and the controller pushes changes. Other implementations are possible as well such as those relying on OpenFlow.

For certain transformations, the end-hosts (e.g., a NCCL driver) are configured to introspect the availability of corresponding transformation along their network paths. For example, with multicast, a source knows whether to assume that multicast will be supported.

As another example, for collective scheduling, to overlap computation and communication, an end-host is configured to know the effective topology for the collective. In various embodiments, multiple implementors of these transformations can interoperate with each other.

Figure 2:
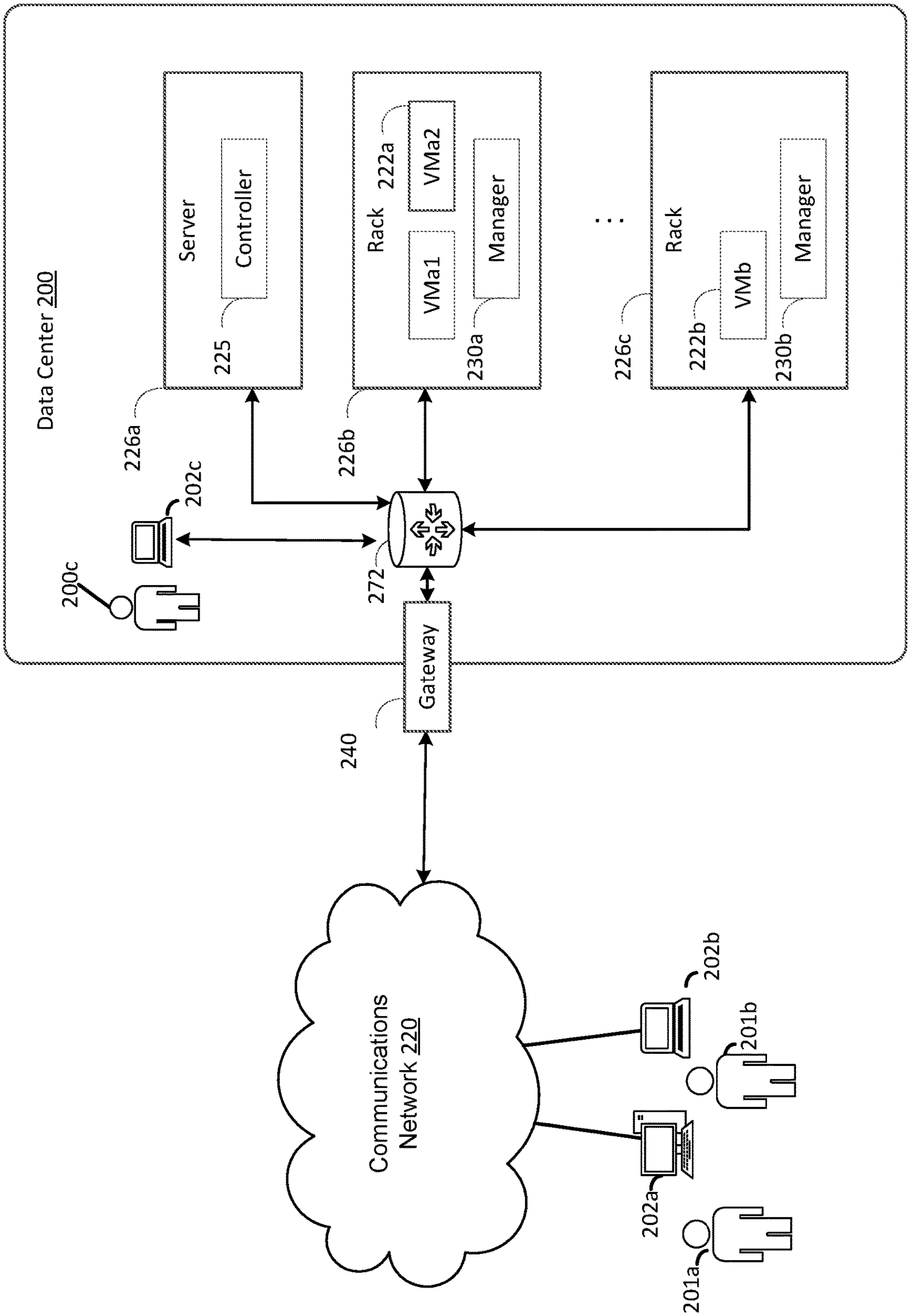
FIG. 2 is a diagram illustrating an example architecture in accordance with the present disclosure.

FIG. 2 illustrates an example computing environment in which the embodiments described herein may be implemented. FIG. 2 illustrates a data center 200 that is configured to provide computing resources to users 200*a*, 200*b*, or 200*c* (which may be referred herein singularly as "a user 201" or in the plural as "the users 201") via user computers 202*a*, 202*b*, and 202*c* (which may be referred herein singularly as "a computer 202" or in the plural as "the computers 202") via a communications network 220. The computing resources provided by the data center 200 may include various types of resources, such as computing resources, data storage resources, data communication resources, and the like. Each type of computing resource may be general-purpose or may be available in a number of specific configurations. It should be appreciated that although the embodiments disclosed above are discussed in the context of virtual machines, other types of implementations can be utilized with the concepts and technologies disclosed herein, for example containers. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 200 may correspond to network 100 in FIG. 1. Data center 200 may include servers 226*a*, 226*b*, and 226*c* (which may be referred to herein singularly as "a server 226" or in the plural as "the servers 226") that may be standalone or installed in server racks, and provide computing resources available as virtual machines 222*a* and 222*b* (which may be referred to herein singularly as "a virtual machine 222" or in the plural as "the virtual machines 222"). The virtual machines 222 may be configured to execute applications such as Web servers, application servers, media servers, database servers, and the like. Other resources that may be provided include data storage resources (not shown on FIG. 2) and may include file storage devices, block storage devices, and the like. Servers 226 may also execute functions that manage and control allocation of resources in the data center, such as a controller 225. Controller 225 may be a fabric controller or another type of program configured to manage the allocation of virtual machines on servers 226.

Referring to FIG. 2, communications network 220 may, for example, be a publicly accessible network of linked networks and may be operated by various entities, such as the Internet. In other embodiments, communications network 220 may be a private network, such as a corporate network that is wholly or partially inaccessible to the public.

Communications network 220 may provide access to computers 202. Computers 202 may be computers utilized by users 201. Computer 202*a*, 202*b* or 202*c* may be a server, a desktop or laptop personal computer, a tablet computer, a smartphone, a set-top box, or any other computing device capable of accessing data center 200. User computer 202*a* or 202*b* may connect directly to the Internet (e.g., via a cable modem). User computer 202*c* may be internal to the data center 200 and may connect directly to the resources in the data center 200 via internal networks. Although only three user computers 202*a*,202*b*, and 202*c* are depicted, it should be appreciated that there may be multiple user computers.

Computers 202 may also be utilized to configure aspects of the computing resources provided by data center 200. For example, data center 200 may provide a Web interface through which aspects of its operation may be configured through the use of a Web browser application program executing on user computer 202. Alternatively, a stand-alone application program executing on user computer 202 may be used to access an application programming interface (API) exposed by data center 200 for performing the configuration operations.

Servers 226 may be configured to provide the computing resources described above. One or more of the servers 226 may be configured to execute a manager 220*a* or 220*b* (which may be referred herein singularly as "a manager 230" or in the plural as "the managers 230") configured to execute the virtual machines. The managers 230 may be a virtual machine monitor (VMM), fabric controller, or another type of program configured to enable the execution of virtual machines 222 on servers 226, for example.

It should be appreciated that although the embodiments disclosed above are discussed in the context of virtual machines, other types of implementations can be utilized with the concepts and technologies disclosed herein.

In the example data center 200 shown in FIG. 2, a network device 272 may be utilized to interconnect the servers 226*a* and 226*b*. Network device 272 may comprise one or more switches, routers, or other network devices. Network device 272 may also be connected to gateway 240, which is connected to communications network 220. Network device 272 may facilitate communications within networks in data center 200, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 200 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

In some of the illustrated example scenarios described herein, SDN capabilities may be enhanced by disaggregating policy enforcement from the host and moving it elsewhere on the network, such as onto an SDN appliance. Software defined networking (SDN) is conventionally implemented on a general-purpose compute node. The SDN control plane may program the host to provide core network functions such as security, virtual network, and load balancer policies. An SDN appliance can be used to host these agents and provide switch functionality, and can further provide transformations and connectivity. The SDN appliance can accept policies that perform transformations. In some embodiments, an agent can be implemented that programs the drivers that run on the SDN appliance. The traffic sent by workloads can be directed through the SDN appliance, which can apply policies and perform transformations on the traffic and send the traffic to the destination. In some configurations, the SDN appliance may include a virtual switch such as a virtual filtering platform.

It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 3A:
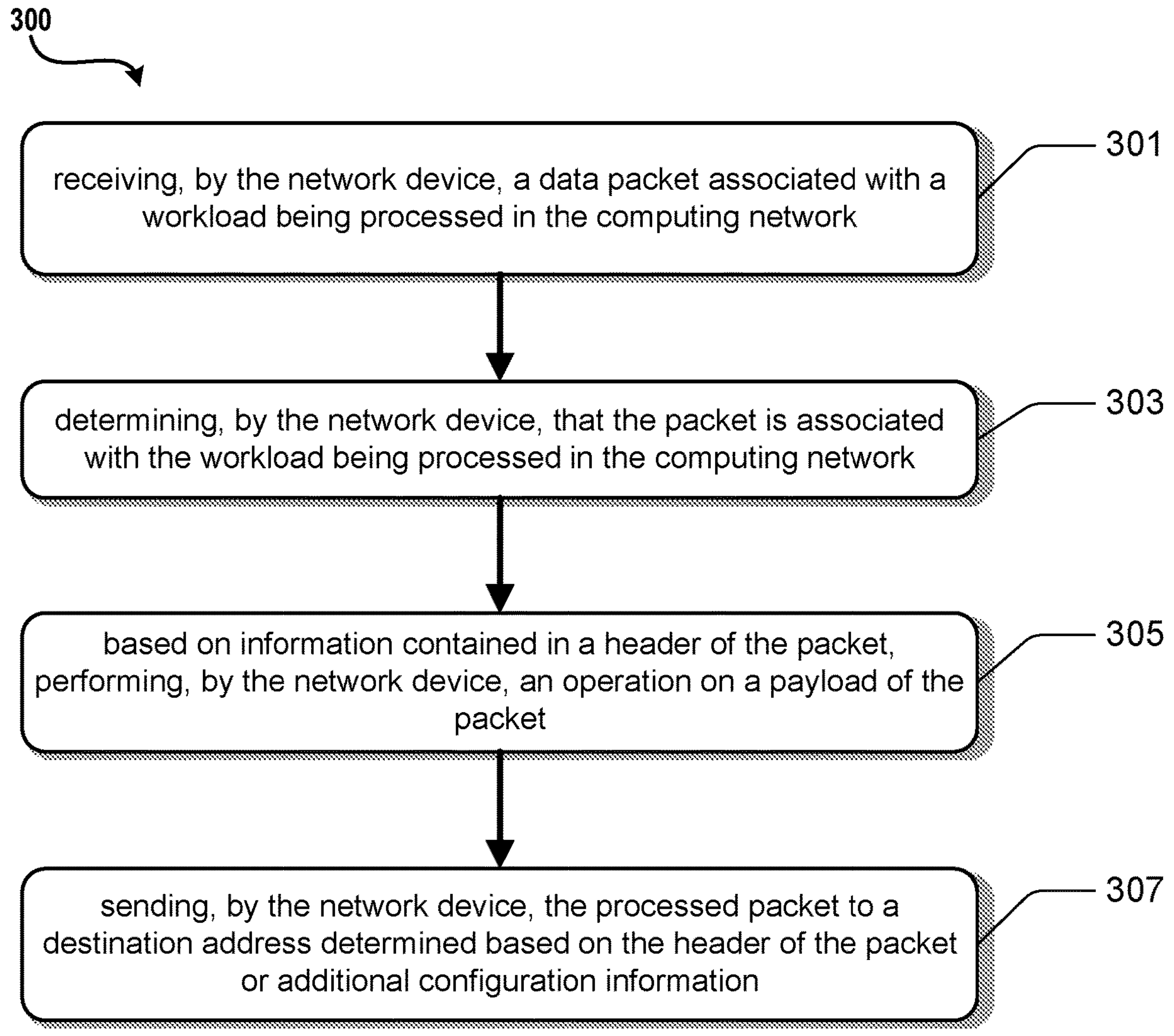
FIGS. 3A and 3B are flowcharts depicting example procedures in accordance with the present disclosure.

Turning now to FIG. 3A, illustrated is an example operational procedure 300 for processing data packets. Such an operational procedure can be provided by one or more components illustrated in FIGS. 1 through 2. The operational procedure may be implemented in a computing network processing workloads in a virtualized computing network comprising a plurality of computing nodes and network devices configured to implement a software defined network (SDN). The computing nodes host virtual machines or containers and the network devices configured to process data packets associated with the workloads outside of the computing nodes. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3A, operation 301 illustrates receiving, by the network device, a data packet associated with a workload being processed in the computing network.

Operation 303 illustrates determining, by the network device, that the packet is associated with the workload being processed in the computing network.

Operation 305 illustrates based on information contained in a header of the packet, performing, by the network device, an operation on a payload of the packet.

Operation 307 illustrates sending, by the network device, the processed packet to a destination address determined based on the header of the packet or additional configuration information.

Figure 3B:
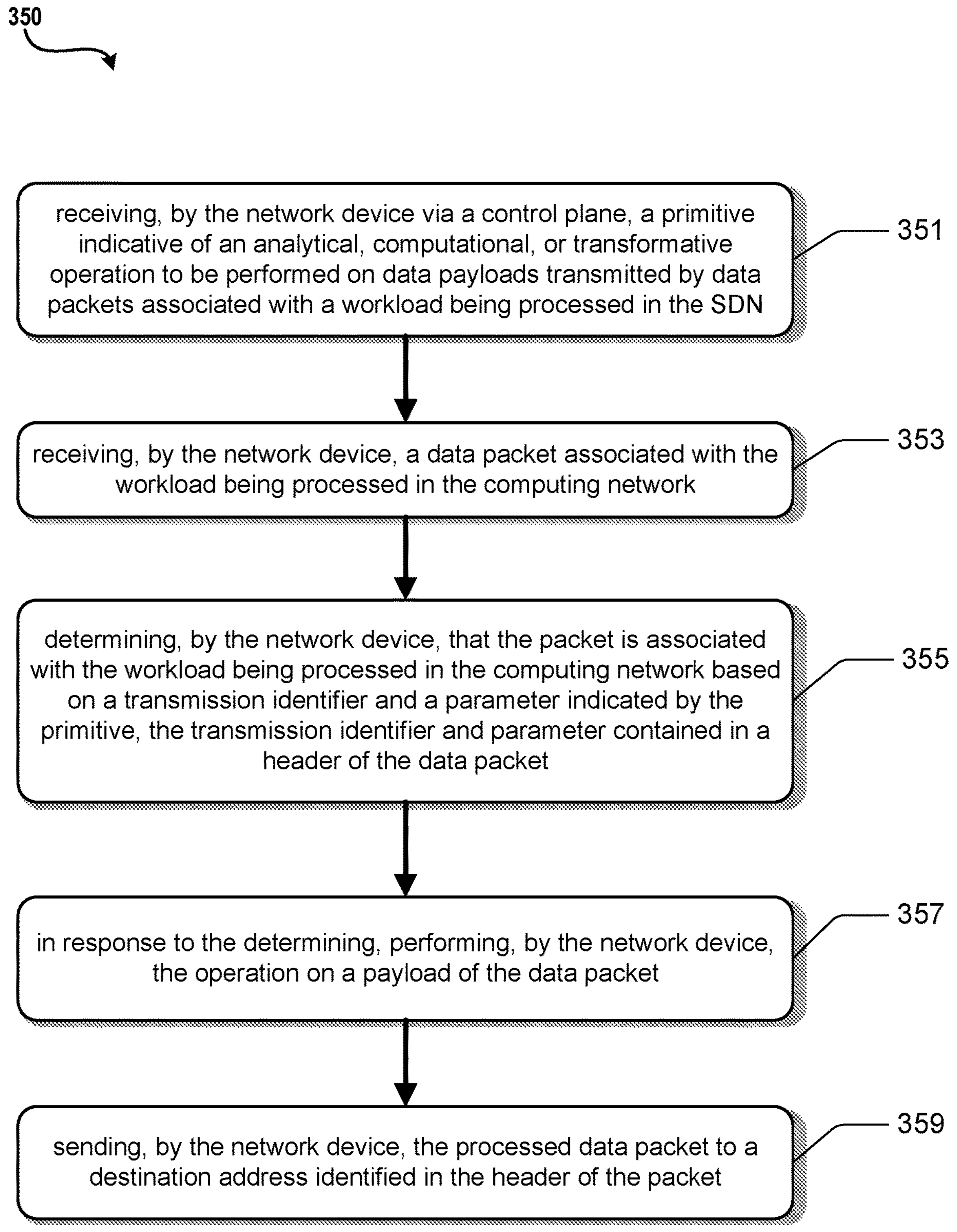

Turning now to FIG. 3B, illustrated is another example operational procedure 350 for processing data packets. Such an operational procedure can be provided by one or more components illustrated in FIGS. 1 through 2. The operational procedure may be implemented in a network device operating in a software defined network (SDN). The network device is configured to execute primitives for data payloads in the packets associated with the workloads in the network prior to forwarding the packets to hosts in the SDN. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

Referring to FIG. 3A, operation 351 illustrates receiving, by the network device via a control plane, a primitive indicative of an analytical, computational, or transformative operation to be performed on data payloads transmitted by data packets associated with a workload being processed in the SDN. In an embodiment, the primitive is associated with a protocol for configuring network devices to perform in-network acceleration of workloads in coordination with source and destination hosts in the SDN.

Operation 353 illustrates receiving, by the network device, a data packet associated with the workload being processed in the computing network.

Operation 355 illustrates determining, by the network device, that the packet is associated with the workload being processed in the computing network based on a transmission identifier and a parameter indicated by the primitive. In an embodiment, the transmission identifier and parameter are contained in a header of the data packet.

Operation 357 illustrates in response to the determining, performing, by the network device, the operation on a payload of the data packet.

Operation 359 illustrates sending, by the network device, the processed data packet to a destination address identified in the header of the packet.

Figure 4:
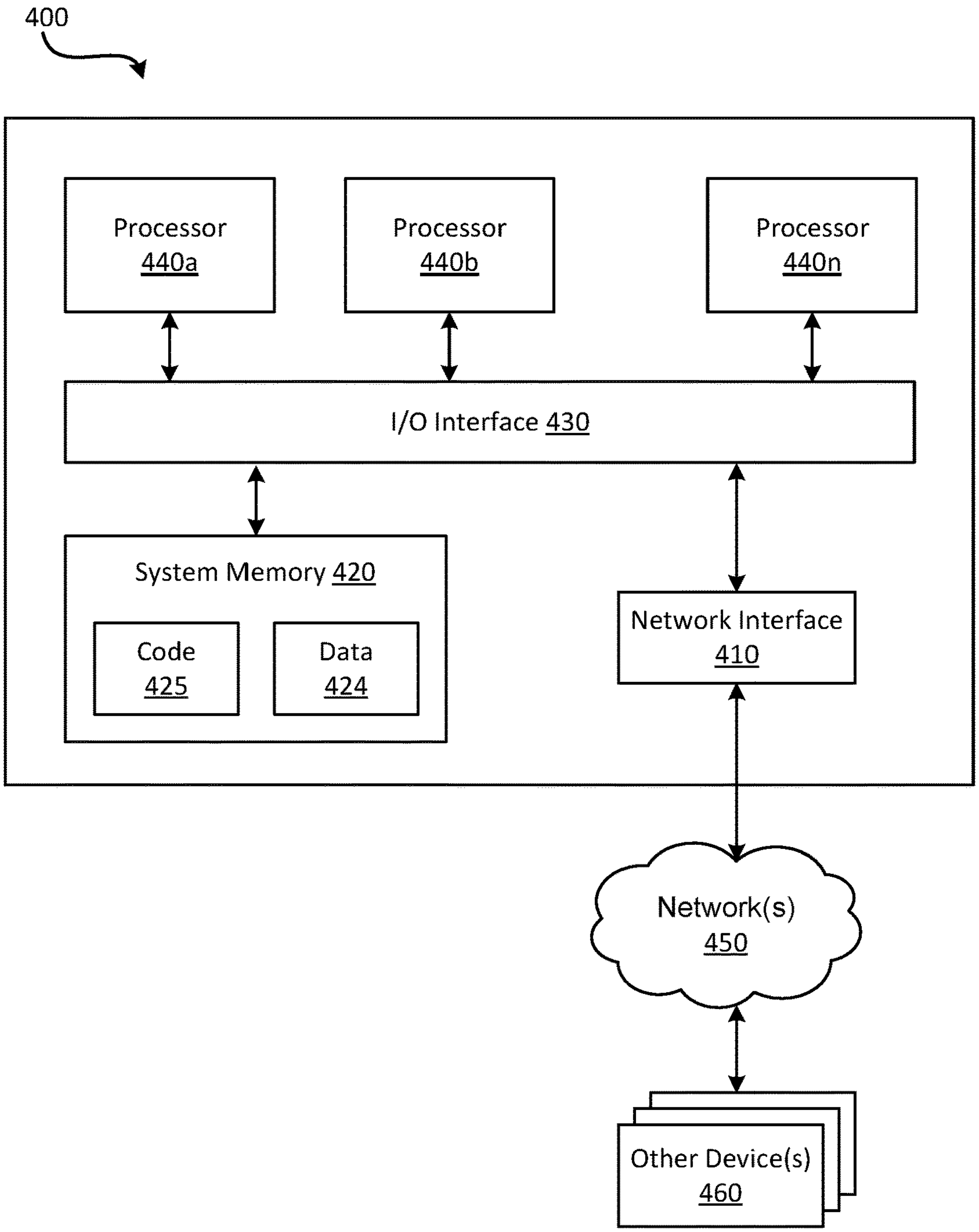
FIG. 4 is an example computing system in accordance with the present disclosure.

FIG. 4 illustrates a general-purpose computing device 400. In the illustrated embodiment, computing device 400 includes one or more processors 44*a*, 44*b*, and/or 44*n* (which may be referred herein singularly as "a processor 440" or in the plural as "the processors 44") coupled to a system memory 420 via an input/output (I/O) interface 430. Computing device 400 further includes a network interface 410 coupled to I/O interface 430.

In various embodiments, computing device 400 may be a uniprocessor system including one processor 440 or a multiprocessor system including several processors 44 (e.g., two, four, eight, or another suitable number). Processors 44 may be any suitable processors capable of executing instructions. For example, in various embodiments, processors 44 may be general-purpose or embedded processors implementing any of a variety of instruction set architectures (ISAs), such as the x44, PowerPC, SPARC, or MIPS ISAs, or any other suitable ISA. In multiprocessor systems, each of processors 44 may commonly, but not necessarily, implement the same ISA.

System memory 420 may be configured to store instructions and data accessible by processor(s) 440. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 420 as code 425 and data 424.

In one embodiment, I/O interface 430 may be configured to coordinate I/O traffic between the processor 440, system memory 420, and any peripheral devices in the device, including network interface 410 or other peripheral interfaces. In some embodiments, I/O interface 430 may perform any necessary protocol, timing, or other data transformations to convert data signals from one component (e.g., system memory 420) into a format suitable for use by another component (e.g., processor 440). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components. Also, in some embodiments some or all of the functionality of I/O interface 430, such as an interface to system memory 420, may be incorporated directly into processor 440.

Network interface 410 may be configured to allow data to be exchanged between computing device 400 and other device or devices 460 attached to a network or network(s) 450, such as other computer systems or devices as illustrated in FIGS. 1 through 5, for example. In various embodiments, network interface 410 may support communication via any suitable wired or wireless general data networks, such as types of Ethernet networks, for example. Additionally, network interface 410 may support communication via telecommunications/telephony networks such as analog voice networks or digital fiber communications networks, via storage area networks such as Fibre Channel SANs or via any other suitable type of network and/or protocol.

In some embodiments, system memory 420 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 400 via I/O interface 430. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 400 as system memory 420 or another type of memory. Further, a computer-accessible medium may include transmission media or signals such as electrical, electromagnetic or digital signals, conveyed via a communication medium such as a network and/or a wireless link, such as may be implemented via network interface 410. Portions or all of multiple computing devices, such as those illustrated in FIG. 4, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 4, may include other components that are not explicitly shown in FIG. 4, or may utilize an architecture completely different than that shown in FIG. 4.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for processing data packets in a computing network processing workloads in a virtualized computing network comprising a plurality of computing nodes and network devices configured to implement a software defined network (SDN), the computing nodes hosting virtual machines or containers and the network devices configured to process data packets associated with the workloads outside of the computing nodes, the method comprising:

receiving, by the network device, a data packet associated with a workload being processed in the computing network;

determining, by the network device, that the packet is associated with the workload being processed in the computing network;

based on information contained in a header of the packet, performing, by the network device, an operation on a payload of the packet; and sending, by the network device, the processed packet to a destination address determined based on the header of the packet or additional configuration information.

Clause 2: The method of clause 1, wherein the workload comprises an artificial intelligence (AI) workload.

Clause 3: The method of any of clauses 1-2, wherein determining the destination address comprises determining a VXLAN header of the data packet.

Clause 4: The method of any of clauses 1-3, further comprising:

in response to determining that the destination address indicates a broadcast IP address, broadcasting the data packet to all nodes associated with a VNET ID of the workload.

Clause 5: The method of any of clauses 1-4, further comprising:

identifying an aggregation operation of the data packet based on an operation ID, operation type, and data ID in a VXLAN extension header of the data packet.

Clause 6: The method of any of clauses 1-5, further comprising:

in response to determining that the data packet needs to be aggregated, broadcasting results of the aggregation operation to all nodes associated with the VNET ID of the workload.

Clause 7: The method of any of clauses 1-6, wherein the workload is identified with a unique VXLAN ID.

Clause 8: The method of any of clauses 1-7, wherein the network device is a switch configured with data processing units (DPUs).

Clause 9: The method of any of clauses 1-8, wherein the switch is deployed as a Tier 0 switch.

Clause 10: A network device configured to manage data packets in a computing network processing artificial intelligence (AI) workloads, the network device configured to perform operations comprising:

receiving a data packet associated with an AI workload being processed in the computing network;

determining that the packet is associated with the AI workload being processed in the computing network;

based on information contained in a header of the packet, performing an operation on a payload of the packet to generate a processed packet; and sending the processed packet with the to a destination address identified in the header of the packet.

Clause 11: The network device of clause 10, wherein determining the destination address comprises determining a VXLAN header of the data packet and wherein the network device is configured to perform operations comprising:

in response to determining that the destination address indicates a broadcast IP address, broadcasting the data packet to all nodes associated with a VNET ID of the AI workload.

Clause 12: The network device of any of clauses 10 and 11, wherein the network device is configured to perform operations comprising:

identifying an aggregation operation of the data packet based on an operation ID, operation type, and data ID in a VXLAN extension header of the data packet.

Clause 13: The network device of any of clauses 10-12, wherein the network device is configured to perform operations comprising:

in response to determining that the data packet needs to be aggregated, broadcasting results of the aggregation operation to all nodes associated with the VNET ID of the AI workload.

Clause 14: The network device of any of clauses 10-13, wherein the AI workload is identified with a unique VXLAN ID.

Clause 15: The network device of any of clauses 10-14, wherein the network device is a switch configured with data processing units (DPUs).

Clause 16: The network device of any of clauses 10-15, wherein the switch is deployed as a Tier 0 switch.

Clause 17: A system for processing data packets in a computing network processing artificial intelligence (AI) workloads in a virtualized computing network comprising a plurality of computing nodes and network devices configured to implement a software defined network (SDN), the computing nodes hosting virtual machines or containers and the network devices configured to process data packets associated with the AI workloads outside of the computing nodes, the network device configured to perform operations comprising:

receiving, by the network device, a data packet associated with an AI workload being processed in the computing network;

determining, by the network device, that the packet is associated with the AI workload being processed in the computing network;

based on information contained in a header of the packet, performing, by the network device, an operation on a payload of the packet; and sending, by the network device, the processed packet to a destination address identified in the header of the packet.

Clause 18: The system of clause 17, wherein determining the destination address comprises determining a VXLAN header of the data packet.

Clause 19: The system of any of clauses 17 and 18, wherein the network device is a switch configured with data processing units (DPUs).

Clause 20: The system of any of the clauses 17-19, wherein the AI workload is identified with a unique VXLAN ID.

The disclosure presented herein also encompasses the subject matter set forth in the following additional set of clauses:

Clause 1: A method for processing data packets in a computing network processing workloads in a network device operating in a software defined network (SDN), the network device configured to execute primitives for data payloads in the packets associated with the workloads in the network prior to forwarding the packets to hosts in the SDN, the method comprising:

receiving, by the network device via a control plane, a primitive indicative of an analytical, computational, or transformative operation to be performed on data payloads transmitted by data packets associated with a workload being processed in the SDN, wherein the primitive is associated with a protocol for configuring network devices to perform in-network acceleration of workloads in coordination with source and destination hosts in the SDN;

receiving, by the network device, a data packet associated with the workload being processed in the computing network;

determining, by the network device, that the packet is associated with the workload being processed in the computing network based on a transmission identifier and a parameter indicated by the primitive, the transmission identifier and parameter contained in a header of the data packet;

in response to the determining, performing, by the network device, the operation on a payload of the data packet; and sending, by the network device, the processed data packet to a destination address identified in the header of the packet.

Clause 2: The method of clause 1, wherein the workload comprises an artificial intelligence (AI) workload.

Clause 3: The method of any of clauses 1-2, wherein the network device comprises one of a network interface card (NIC), a network switch, or a disaggregated pool of NICs.

Clause 4: The method of any of clauses 1-3, wherein the workload comprises a collective.

Clause 5: The method of any of clauses 1-4, wherein the operations comprise multicast, in-network aggregation, or gradient compression.

Clause 6: The method of any of clauses 1-5, wherein the workload comprises one or more of a one-to-one transformation, one-to-many transformation, or many-to-one transformation.

Clause 7: The method of any of clauses 1-6, wherein the primitive is received by the network device via an application programming interface (API) operable to receive a message indicative of the primitive and instructions to the network device for executing the primitive.

Clause 8: The method of any of clauses 1-7, wherein the API is configured to receive a control path and a data path for a primitive.

Clause 9: The method of any of clauses 1-8, wherein the control path includes a transformation identifier, a match clause, and transformation information.

Clause 10: The method of any of clauses 1-9, wherein the match clause includes one of an offset from which to obtain values of the transformation identifier, or a Boolean valued filter expression.

Clause 11: A network device configured to process data packets in a computing network processing artificial intelligence (AI) workloads in a software defined network (SDN), the network device configured to execute primitives for packets associated with the AI workloads prior to forwarding the packets to hosts in the SDN, the network device configured to perform operations comprising:

receiving, by the network device, a primitive indicative of an operation to be performed on data transmitted by data packets associated with an AI workload being processed in the SDN;

receiving, by the network device, a data packet associated with the AI workload being processed in the computing network;

determining, by the network device, that the packet is associated with the AI workload being processed in the computing network based on a transmission identifier and a parameter indicated by the primitive, the transmission identifier and parameter contained in a header of the data packet;

in response to the determining, performing, by the network device, the operation on a payload of the data packet; and sending, by the network device, the processed data packet to a destination address identified in the header of the packet.

Clause 12: The network device of clause 11, wherein the AI workloads comprise a collective.

Clause 13: The network device of any of clauses 11 and 12, wherein the operations comprise multicast, in-network aggregation, or gradient compression.

Clause 14: The network device of any of clauses 11-13, wherein the AI workload comprises one or more of a one-to-one transformation, one-to-many transformation, or many-to-one transformation.

Clause 15: The network device of any of clauses 11-14, wherein the primitive is received by the network device via an application programming interface (API) operable to receive a message indicative of the primitive and instructions to the network device for executing the primitive Clause 16: The network device of any of clauses 11-15, wherein the API is configured to receive a control path and a data path for a primitive.

Clause 17: The network device of any of clauses 11-16, wherein the control path includes a transformation identifier, a match clause, and transformation information.

Clause 18: The network device of any of clauses 11-17, wherein the match clause includes one of an offset from which to obtain values of the transformation identifier, or a Boolean valued filter expression.

Clause 19: A system for processing data packets in a computing network processing artificial intelligence (AI) workloads in a network device operating in a software defined network (SDN), the network device configured to execute primitives for packets associated with the AI workloads prior to forwarding the packets to hosts in the SDN, the network device configured to perform operations comprising:

receiving, by the network device, a primitive indicative of an operation to be performed on data transmitted by data packets associated with an AI workload being processed in the SDN;

receiving, by the network device, a data packet associated with the AI workload being processed in the computing network;

determining, by the network device, that the packet is associated with the AI workload being processed in the computing network based on a transmission identifier and a parameter indicated by the primitive, the transmission identifier and parameter contained in a header of the data packet;

in response to the determining, performing, by the network device, the operation on a payload of the data packet; and sending, by the network device, the processed data packet to a destination address identified in the header of the packet.

Clause 20: The system of clause 19, wherein the primitive is received by the network device via an application programming interface (API) operable to receive a message indicative of the primitive and instructions to the network device for executing the primitive.

What is claimed is:

1. A method for processing data packets in a computing network processing workloads in a virtualized computing network comprising a plurality of computing nodes and network devices configured to implement a software defined network (SDN), the computing nodes hosting virtual machines or containers and the network devices configured to process data packets associated with the workloads outside of the computing nodes, the method comprising:

receiving, by the network device, a data packet associated with a workload being processed in the computing network;

determining, by the network device, that the packet is associated with the workload being processed in the computing network;

receiving, by the network device via a control plane, a primitive indicative of an operation to be performed on payloads of data packets associated with the workload;

based on information contained in a header of the packet, performing, by the network device, the operation on a payload of the packet according to the primitive, eliminating round trip packet transmission between the network device and the computing nodes by performing the operation at the network device; and sending, by the network device, the processed packet to a destination address determined based on the header of the packet or additional configuration information.

2. The method of claim 1, wherein the workload comprises an artificial intelligence (AI) workload.

3. The method of claim 1, wherein determining the destination address comprises determining a Virtual Extensible Local Area Network (VXLAN) header of the data packet.

4. The method of claim 3, further comprising:

in response to determining that the destination address indicates a broadcast IP address, broadcasting the data packet to all nodes associated with a Virtual Network (VNET) ID of the workload.

5. The method of claim 4, further comprising:

identifying an aggregation operation of the data packet based on an operation ID, operation type, and data ID in a VXLAN extension header of the data packet.

6. The method of claim 5, further comprising:

in response to determining that the data packet needs to be aggregated, broadcasting results of the aggregation operation to all nodes associated with the VNET ID of the workload.

7. The method of claim 1, wherein the workload is identified with a unique VXLAN ID.

8. The method of claim 1, wherein the network device is a switch configured with data processing units (DPUs).

9. The method of claim 8, wherein the switch is deployed as a Tier 0 switch.

10. A network device configured to manage data packets in a computing network processing artificial intelligence (AI) workloads, the network device configured to perform operations comprising:

receiving a data packet associated with an AI workload being processed in the computing network;

determining that the packet is associated with the AI workload being processed in the computing network;

receiving, via a control plane, a primitive indicative of an operation to be performed on payloads of data packets associated with the workload;

based on information contained in a header of the packet, performing the operation on a payload of the packet to generate a processed packet according to the primitive, eliminating round trip packet transmission between the network device and computing nodes of the computing network by performing the operation at the network device; and sending the processed packet to a destination address identified in the header of the packet.

11. The network device of claim 10, wherein determining the destination address comprises determining a VXLAN header of the data packet and wherein the network device is configured to perform operations comprising:

in response to determining that the destination address indicates a broadcast IP address, broadcasting the data packet to all nodes associated with a VNET ID of the AI workload.

12. The network device of claim 11, wherein the network device is configured to perform operations comprising:

identifying an aggregation operation of the data packet based on an operation ID, operation type, and data ID in a VXLAN extension header of the data packet.

13. The network device of claim 12, wherein the network device is configured to perform operations comprising:

in response to determining that the data packet needs to be aggregated, broadcasting results of the aggregation operation to all nodes associated with the VNET ID of the AI workload.

14. The network device of claim 10, wherein the AI workload is identified with a unique VXLAN ID.

15. The network device of claim 10, wherein the network device is a switch configured with data processing units (DPUs).

16. The network device of claim 15, wherein the switch is deployed as a Tier 0 switch.

17. A system for processing data packets in a computing network processing artificial intelligence (AI) workloads in a virtualized computing network comprising a plurality of computing nodes and network devices configured to implement a software defined network (SDN), the computing nodes hosting virtual machines or containers and the network devices configured to process data packets associated with the AI workloads outside of the computing nodes, the network devices configured to perform operations comprising:

receiving, by the network devices, a data packet associated with an AI workload being processed in the computing network;

determining, by the network devices, that the packet is associated with the AI workload being processed in the computing network;

receiving, by the network devices via a control plane, a primitive indicative of an operation to be performed on payloads of data packets associated with the workload;

based on information contained in a header of the packet, performing, by the network devices, the operation on a payload of the packet according to the primitive, eliminating round trip packet transmission between the network device and the computing nodes by performing the operation at the network device; and sending, by the network devices, the processed packet to a destination address identified in the header of the packet.

18. The system of claim 17, wherein determining the destination address comprises determining a VXLAN header of the data packet.

19. The system of claim 17, wherein the network device is a switch configured with data processing units (DPUs).

20. The system of claim 17, wherein the AI workload is identified with a unique VXLAN ID.

* * * * *